US007859145B2

(12) United States Patent
Rapp et al.

(10) Patent No.: US 7,859,145 B2
(45) Date of Patent: Dec. 28, 2010

(54) ELECTRONICALLY COMMUTATED MOTOR

(75) Inventors: Nils Rapp, St. Georgen (DE); Hansjörg Berroth, VS-Obereschach (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 11/668,508

(22) Filed: Jan. 30, 2007

(65) Prior Publication Data
US 2007/0182261 A1    Aug. 9, 2007

(30) Foreign Application Priority Data
Feb. 3, 2006    (DE) .................. 20 2006 002 068 U

(51) Int. Cl.
*H02K 1/04*    (2006.01)
(52) U.S. Cl. .......................................... 310/43; 310/90
(58) Field of Classification Search .......... 310/216.137, 310/216.088, 43, 40 MM, 67 R, 90, 215
See application file for complete search history.

(56) References Cited

U.S. PATENT DOCUMENTS

| 3,200,269 A | * | 8/1965 | Goldstein et al. ........... 310/301 |
| 4,604,665 A | * | 8/1986 | Muller et al. ............. 360/97.02 |
| 4,612,468 A | * | 9/1986 | Stürm et al. .............. 310/67 R |
| 4,682,065 A | * | 7/1987 | English et al. ................ 310/90 |
| 4,934,041 A | * | 6/1990 | Hoover et al. ................. 29/596 |
| 4,955,791 A | * | 9/1990 | Wrobel ....................... 417/354 |
| 5,170,086 A | * | 12/1992 | Wrobel et al. .............. 310/217 |
| 5,343,104 A | * | 8/1994 | Takahashi et al. ............. 310/90 |
| 5,436,519 A | * | 7/1995 | Takahashi et al. ........... 310/217 |
| 5,666,011 A | * | 9/1997 | Hong ....................... 310/40.5 |
| 5,682,074 A | * | 10/1997 | Di Pietro et al. ............. 310/215 |
| 6,050,786 A | * | 4/2000 | Lin ............................. 417/366 |
| 6,097,129 A | * | 8/2000 | Furtwangler et al. ........ 310/256 |
| 6,318,976 B1 | * | 11/2001 | Hsieh ..................... 417/423.12 |
| 6,507,135 B1 | * | 1/2003 | Winkler ....................... 310/91 |
| 2002/0113519 A1 | * | 8/2002 | Brown ........................ 310/254 |
| 2004/0136842 A1 | * | 7/2004 | Obara et al. ................ 417/354 |

(Continued)

FOREIGN PATENT DOCUMENTS

DE    31 23 814    *   4/1982

(Continued)

*Primary Examiner*—Quyen Leung
*Assistant Examiner*—Naishadh N Desai
(74) *Attorney, Agent, or Firm*—Milton Oliver, Esq.; Oliver Intellectual Property LLC

(57) ABSTRACT

For many applications, it is desirable to use fans which weigh less than 30 grams and are driven by electric motors not more than a few centimeters in size. Mass-producing products this small, which nevertheless must be extremely reliable, poses unique manufacturing challenges, which are best overcome by an improved structure which is susceptible to automation. Preferably, the fan motor is electronically commutated and has an internal stator (50) and an external rotor (22) supported on a central rotor shaft (34). The shaft is journaled within a bearing tube (70) supporting first and second rotor bearings (72, 76). By injection-molding the bearing tube (70) with first and second axial extensions (90', 90"), the extensions can hold the bearings in place and insure uniform manufacturing quality and a desirably long service life. One of the extensions can also be shaped to abut against a circuit board (46) which supports components which control commutation.

20 Claims, 12 Drawing Sheets

U.S. PATENT DOCUMENTS

| | | | | |
|---|---|---|---|---|
| 2004/0189125 | A1* | 9/2004 | Doemen | 310/90.5 |
| 2004/0227420 | A1* | 11/2004 | Lulic | 310/90 |
| 2005/0098641 | A1* | 5/2005 | Ardelt et al. | 236/49.3 |
| 2007/0182261 | A1* | 8/2007 | Rapp et al. | 310/90 |

FOREIGN PATENT DOCUMENTS

| | | | |
|---|---|---|---|
| DE | 100 52 039 A | * | 5/2002 |
| DE | 20 2004 016 545 A | * | 12/2004 |
| EP | 1 378 983 | * | 1/2004 |

* cited by examiner

US 7,859,145 B2

ELECTRONICALLY COMMUTATED MOTOR

CROSS-REFERENCE

This application claims priority of German application DE 20 2006 002 068.3, filed 3 Feb. 2006, the entire content of which is hereby incorporated by reference.

FIELD OF THE INVENTION

The invention relates to an electronically commutated motor, in particular to a miniature or subminiature motor. Such motors are preferably used in miniature or subminiature fans.

BACKGROUND

Miniature and subminiature fans usually have very small dimensions and correspondingly weigh very little. Fans of the EBM-PAPST 250 series, for example, have dimensions of 8×25×25 mm and weigh approx. 5 g. For fans of the ebm-papst 400 series, the dimensions are 20×40×40 mm and the weight is less than 30 grams. The motors are correspondingly even smaller and weigh even less than the fans of which they are a part.

With such motors, assembly must be simple and uncomplicated, in order to allow cost-effective manufacture by means of a high level of automation. Uniform quality, which is a prerequisite for a long average service life, can moreover be achieved by extensive automation.

SUMMARY OF THE INVENTION

It is therefore an object of the invention to make available a novel miniature or subminiature motor.

According to the invention, this object is achieved by an electronically commutated motor having an external rotor supported on a rotor shaft, an internal stator including a stator lamination stack defining a plurality of axial slots, and a plastic layer which extends through the slots and also forms a bearing tube for receiving the rotor shaft, the bearing tube being formed with at least one recess which holds in place a respective rolling bearing for journaling the rotor shaft. According to a method aspect of the invention, this plastic element can be injection-molded. A motor of this kind can, in particular, be made very compact, and enables operation at high rotation speeds, i.e. high output. The manufacturing steps can be automated, thereby assuring consistent results and a desirably long service life.

BRIEF FIGURE DESCRIPTION

Further details and advantageous refinements of the invention are evident from the exemplifying embodiments, in no way to be understood as a limitation of the invention, that are described below and depicted in the drawings. In the drawings.

DETAILED DESCRIPTION

Figure 1:
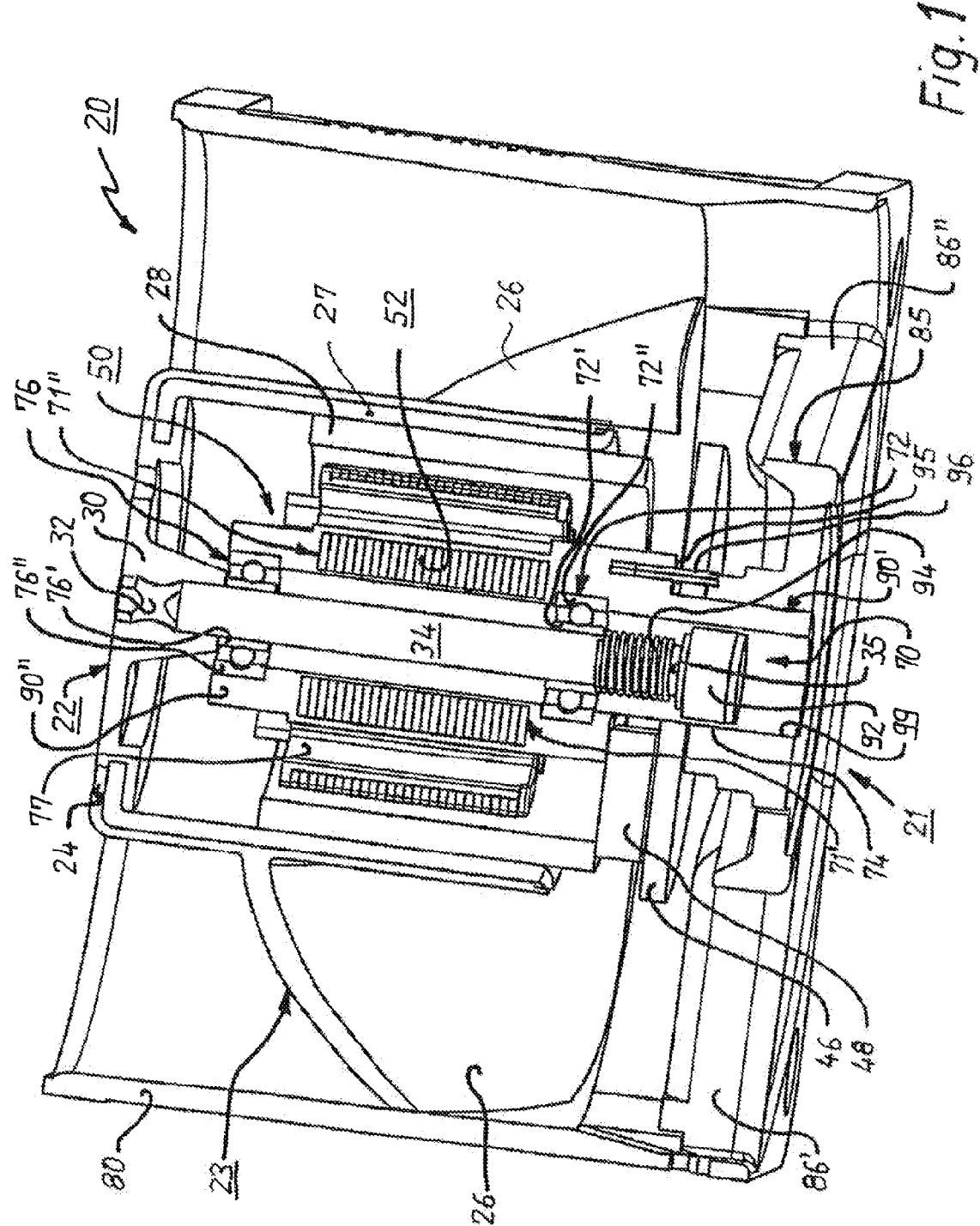
FIG. 1 is a longitudinal section through a fan that is driven by a miniature or subminiature motor according to an embodiment of the invention.

In the description that follows, the terms "left," "right," "top," and "bottom" refer to the respective figure of the drawings and can vary from one figure to the next, depending on the orientation (portrait or landscape) selected in each case. Identical or identically functioning parts are labeled with the same reference characters in the various figures, and are usually described only once.

Figure 13:
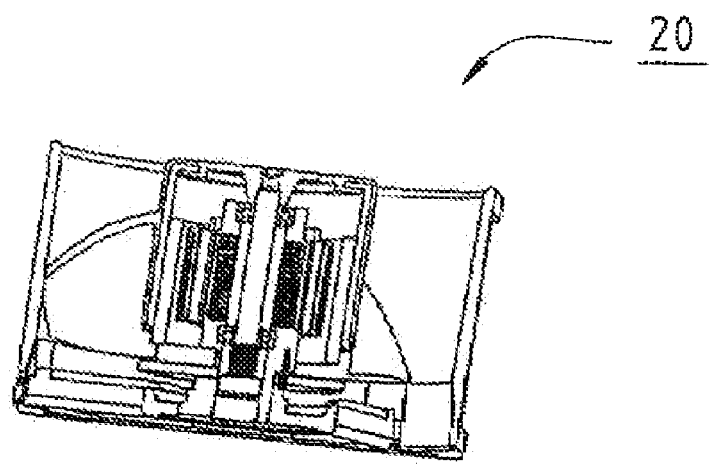
FIG. 13 is a longitudinal section through the fan of FIG. 1, at approximately actual size.

FIG. 1 is a longitudinal section through an axial fan 20 having a motor 21 according to a preferred embodiment of the invention, at greatly enlarged scale (enlarged approximately five times). To illustrate the small dimensions necessary for miniature and subminiature fans, fan 20 is shown in FIG. 13, by way of example, at a scale of approximately 1:1.

Motor 21 is arranged in an air-directing tube 80 and has an external rotor 22 and an internal stator 50. External rotor 22 has a rotor cup 24 on whose outer periphery is provided a fan wheel 23 having fan blades 26. Mounted on the inner periphery of rotor cup 24, on a soft-ferromagnetic yoke element 27, is a rotor magnet 28 that can be magnetized, for example, with four poles. Rotor cup 24 has a base 30 in which an upper shaft end 32 of a rotor shaft 34 is mounted, which shaft has a lower, free shaft end 35. Shaft 34 is preferably made of steel, and rotor cup 24 of plastic. Rotor cup 34 is mounted on upper shaft end 32 by plastic injection molding.

Internal stator 50, which is described in detail in FIGS. 2 to 11, has a stator lamination stack 52 having a plastic coating 77, which together form a bearing tube 70 for journaling of rotor shaft 34. Arranged for this purpose at one end 71' of stator lamination stack 52 is a plastic part 90' therein, in the form of a first axial extension of plastic coating 77, having a bearing 72. Arranged at the other end 71" of stator lamination stack 52 is a plastic part 90" in the form of a second axial extension in which a bearing 76 is present.

According to a preferred embodiment of the invention, plastic coating 77 and extensions 90' and 90" are formed integrally, bearing 72 being held in extension 90' by plastic injection molding, the shape of the molded element form-lockingly defining the alignment of the bearing with respect to the rotor shaft which it journals. As an alternative thereto, extension 90' can be formed as a separate component, in such a way that bearing 72 can be anchored in it by being pressed in. Extension 90' can, in this case, be manufactured independently of plastic coating 77 and, in a simple working step, e.g. press-fitted thereon. Extension 90' can comprise, for this purpose, one or more guidance elements that facilitate such a press-fitting operation. Bearing 76 can likewise optionally be injection-embedded into extension 90''' or pressed into it.

Bearings 72 and 76 are preferably implemented as rolling bearings, but are not limited to a specific bearing type. A variety of bearing types can instead be used, for example, plain bearings. Rolling bearing 72 has an inner ring 72' and an outer ring 72'', and rolling bearing 76 has an inner ring 76' and an outer ring 76''. Rotor shaft 34, rotatably journaled in rolling bearings 72 and 76, is held therein by means of an abutment or retaining element 92 and a compression spring 94. Abutment 92, for example a snap washer or other latching member, is snapped into an annular slot at lower end 35 of shaft 34. Tensioned spring 94 is held between inner ring 72' of rolling bearing 72 and latching member 92. A conical extension of base 30 of rotor cup 24 is pressed by said spring against inner ring 76' of rolling bearing 76, so that shaft 34 is held with dynamic tension in rolling bearings 72 and 76 of internal stator 50. This action of spring 94 is assisted by the fact that rotor magnet 28 is offset downward, with respect to stator lamination stack 52, thereby creating a magnetic pull on external rotor 22 which pulls the latter upward with reference to FIG. 1.

Arranged on outer periphery 74 of extension 90' is a circuit board 46 having a relatively large electronic component 48, e.g. a MOSFET (Metal Oxide Semiconductor Field Effect Transistor), that is provided to control the current in a stator winding 97 of motor 21. Further electronic components, e.g. a Hall IC (Integrated Circuit), can likewise be arranged on circuit board 46, onto which connector elements 96 for stator winding 97 are soldered. These connector elements 96 are supported in a shoulder 95 of extension 90' by plastic injection molding.

The lower end of extension 90' is secured to a hub 85 by being pressed in, and can additionally be adhesively bonded and/or welding thereonto. Struts 86' and 86'', which support air-directing tube 80, extend from this hub 85.613

Figure 2:
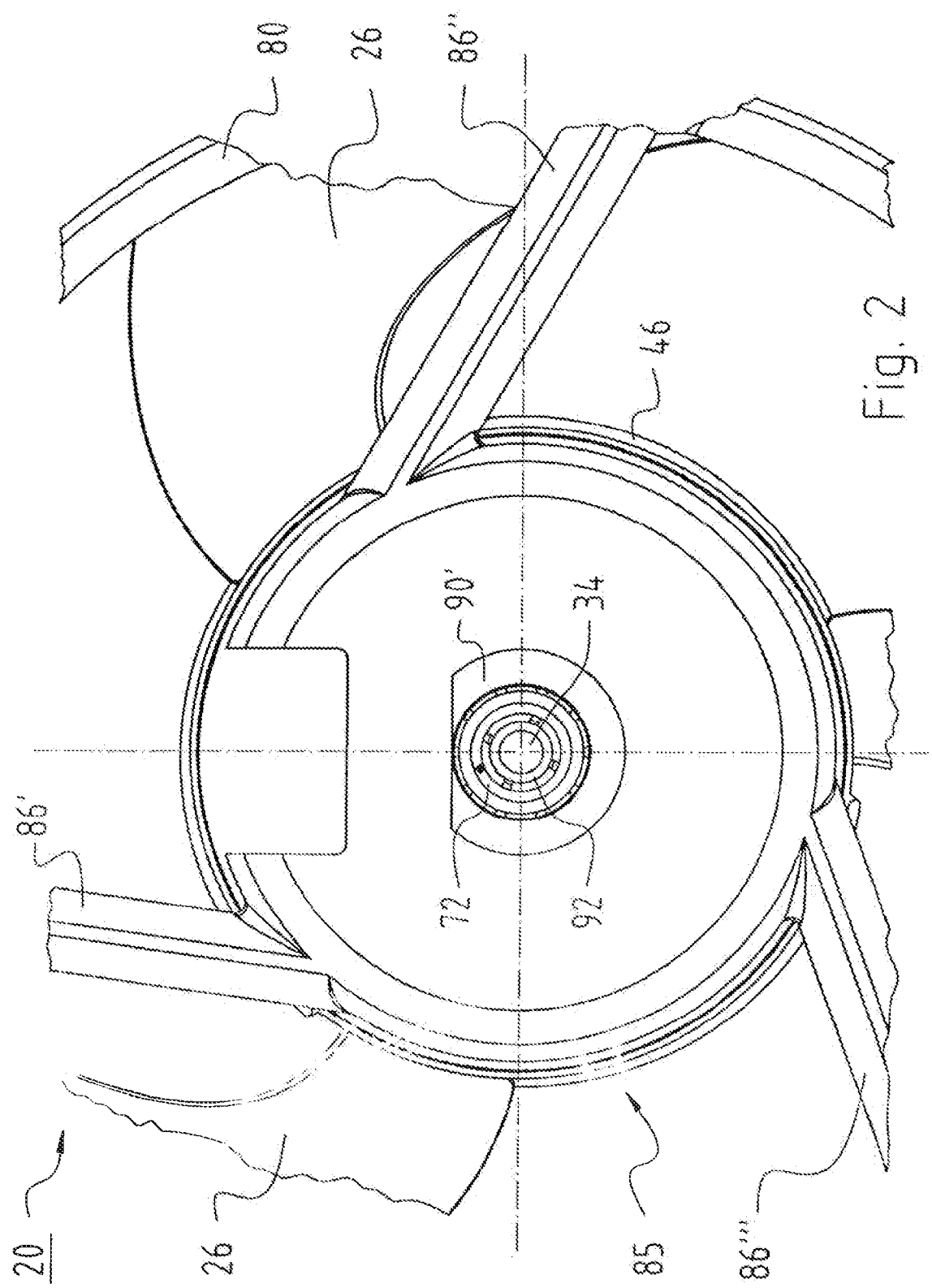
FIG. 2 is a greatly enlarged top view of the hub of the fan of FIG. 1.

FIG. 2 is a top view of hub 85 of fan 20 of FIG. 1. FIG. 2 illustrates struts 86', 86'', and 86''' arranged between hub 85 and air-directing tube 80, as well as extension 90' whose exposed end is connected to hub 85.

Figure 3:
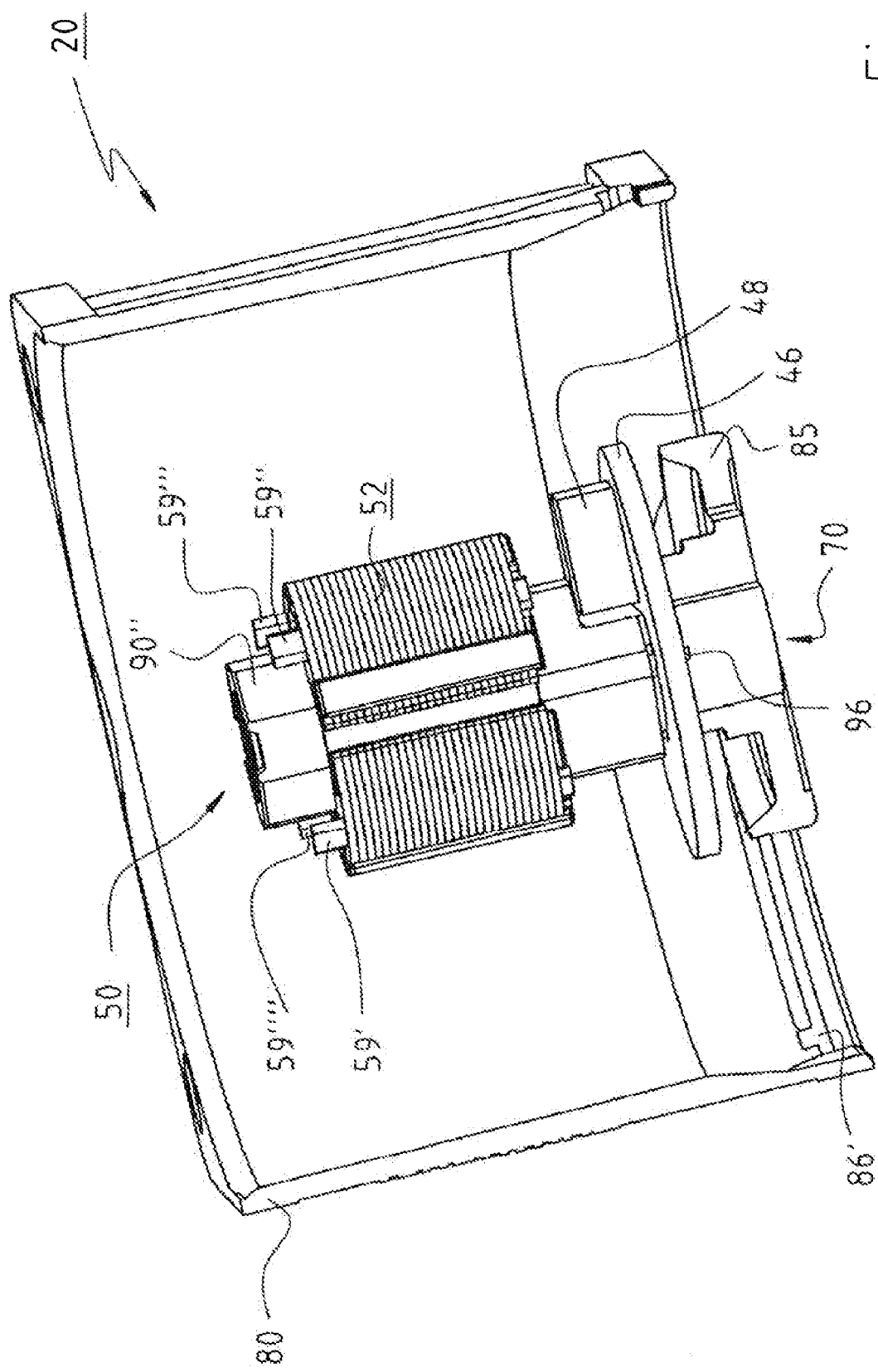
FIG. 3 is a longitudinal section, shown in perspective, through the air-directing tube of the fan of FIG. 1, with a depiction (likewise in perspective) of the internal stator.

FIG. 3 is a perspective longitudinal section through air-directing tube 80 of fan 20, with a perspective depiction of internal stator 50. FIG. 3 illustrates the assembly of fan 20 according to a preferred embodiment, in which, in a first step, circuit board 46 having component 48 thereon is arranged on internal stator 50, and the latter is then mounted on hub 85 in a further step. As is apparent from FIG. 3, internal stator 50 comprises, for example, four spacers 59', 59'', 59''', 59''''. These serve to prevent damage to stator winding 97 when internal stator 50 is pressed into hub 85.

Figure 4:
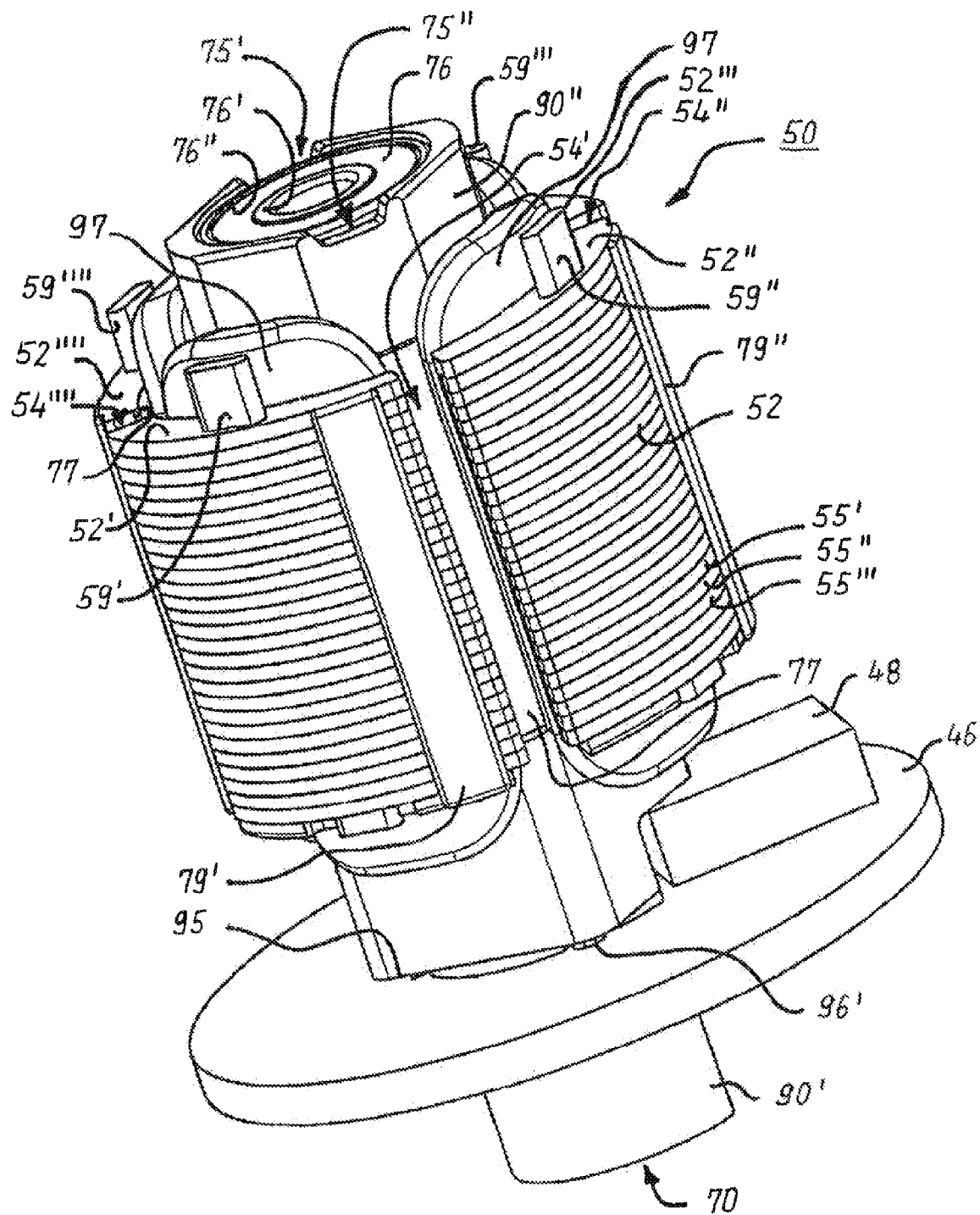
FIG. 4 is a perspective depiction of the internal stator of FIG. 1, with a circuit board and MOSFET (MOS Field Effect Transistor) 48 arranged thereon.
Figure 12:
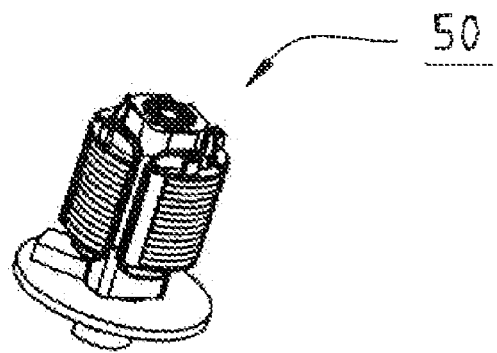
FIG. 12 is a perspective depiction of the internal stator of FIG. 4 at approximately actual size.

FIG. 4 is a three-dimensional view of internal stator 50 (FIG. 3) enlarged approximately ten times. Internal stator 50 is shown for illustrative purposes in FIG. 12, by way of example, at a scale of approximately 1:1.

FIG. 4 shows circuit board 46, abutting against shoulder 95 of extension 90', onto which board connector element 96' is soldered, and also shows rolling bearing 76 mounted in extension 90''. To facilitate the pressing of rolling bearing 76 into extension 90'', the latter has two recesses 75' and 75'' at its upper end.

Stator lamination stack 52 contains laminations, three of which are labeled 55', 55'', and 55'''. Stator lamination stack 52 is "packeted," i.e. its plates or laminations have small holes that are stamped with mating bosses, so that they form an aligned, unitary block. The plastic of plastic coating 77, which plastic is injected into stator lamination stack 52 and, together therewith, forms bearing tube 70, can also stabilize and contribute to the strength of this block. As shown in FIG. 4, this plastic constitutes strip-shaped plastic facings 79 (two plastic facings being labeled 79' and 79'' by way of example) at locations on the outer side of lamination stack 52, which facings further enhance strength.

Figure 9:
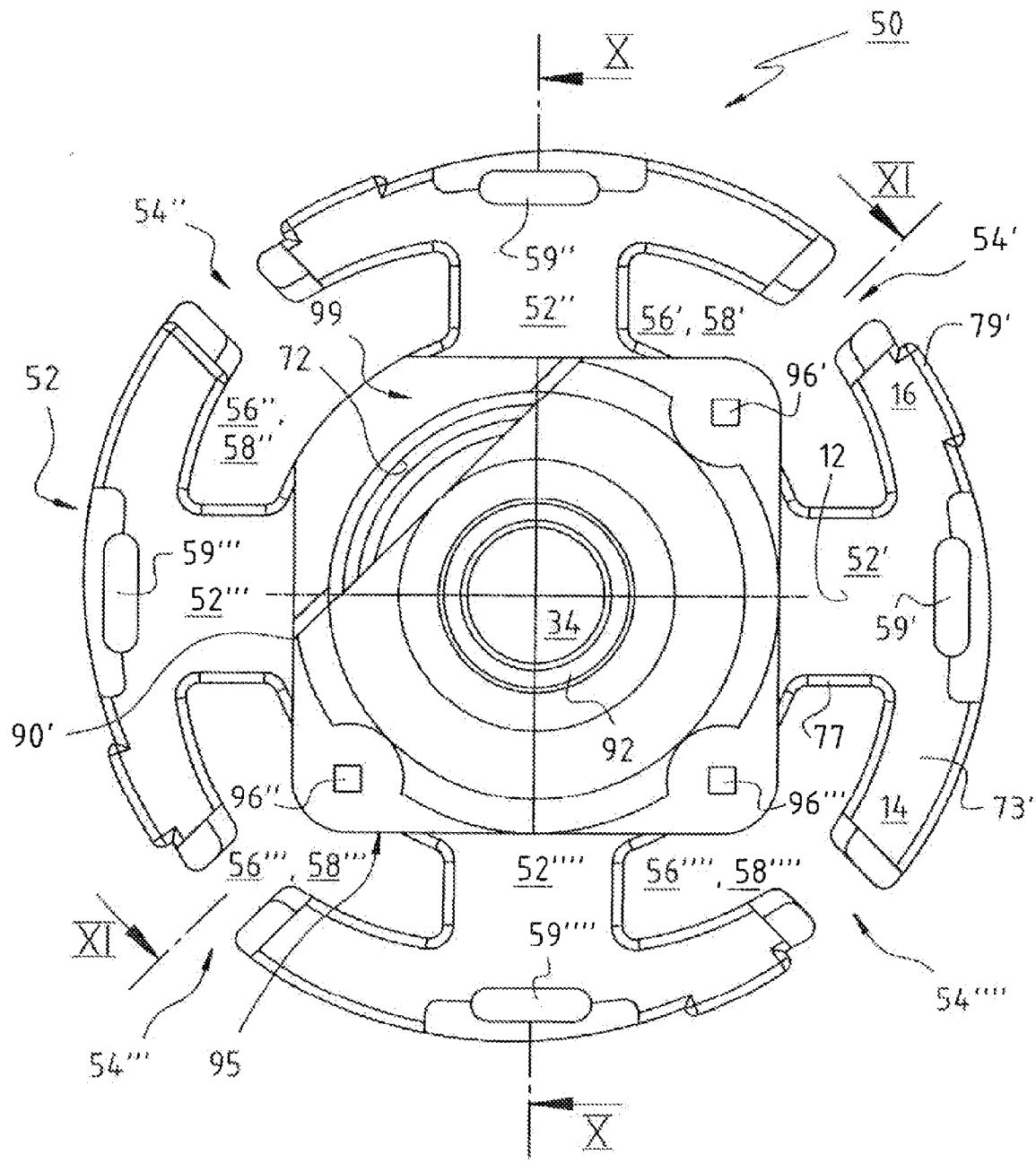
FIG. 9 is a top view of the internal stator of FIG. 8, looking in the direction of arrow IX of FIG. 8.

As shown in FIG. 9, stator lamination stack 52 has salient stator poles 52', 52'', 52''', 52'''' that are separated from one another by slots 54', 54'', 54''', 54'''' through which plastic coating 77 extends. Stator winding 97 is arranged on stator poles 52', 52'', 52''', 52'''' (cf. FIG. 4).

Figure 5:
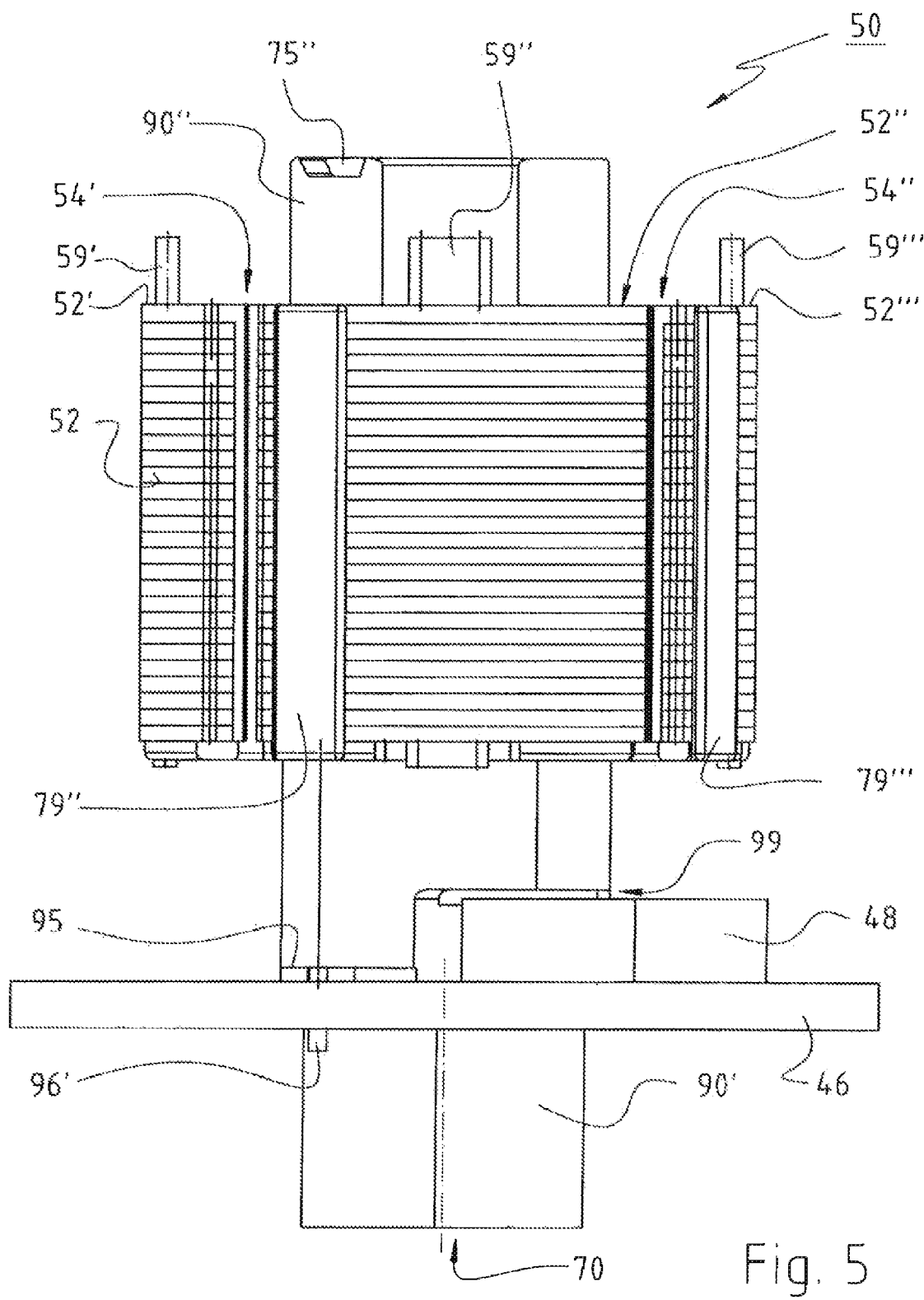
FIG. 5 is a side view of the internal stator of FIG. 4.

FIG. 5 is a side view of internal stator 50 of FIG. 4, but without winding 97, and illustrates shoulder 95 of extension 90', in which shoulder connector element 96' is mounted. In the region of extension 90' in which component 48 is arranged on circuit board 46, said extension has a recess 99.

Figure 6:
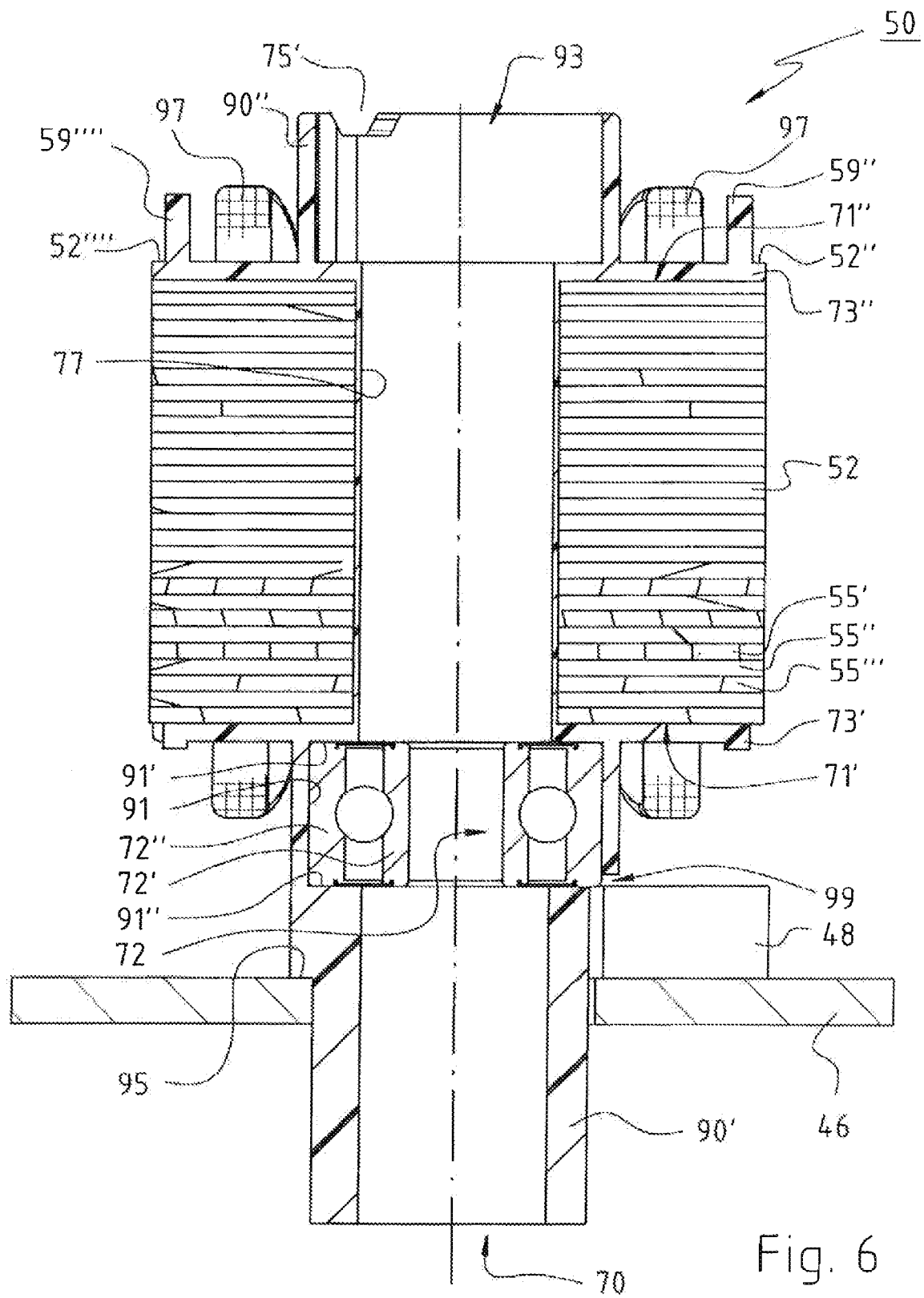
FIG. 6 is a sectioned view of the internal stator of FIG. 4 with one of the two roller bearings, and with a stator winding.

FIG. 6 is a longitudinal section through internal stator 50, and illustrates recess 99 as well as bearing tube 70 formed by plastic coating 77 and stator lamination stack 52.

Plastic coating 77 forms, at lower end 71' of stator lamination stack 52, an end layer 73' on which axial extension 90' is arranged. The latter has a recess or compartment 91 in which first rolling bearing 72 is arranged. Recess 91 is formed with a first shoulder 91' and a second, opposing shoulder 91''. As mentioned with reference to FIG. 1, at least outer ring 72'' of this rolling bearing 72 is injection-embedded into the plastic of extension 90'. For this purpose, prior to plastic injection molding, a first tool is guided from above through stator lamination stack 52 and immobilizes the upper rim of said outer ring 72''. The latter's lower rim is immobilized by a second tool coming from below. The two tools seal off rolling bearing 72, in such a way that no plastic can penetrate into bearing 72 during plastic injection.

At upper end 71'' of stator lamination stack 52, plastic coating 77 forms an end layer or terminal disk 73'' on which axial extension 90'' is arranged. As is apparent from FIG. 6, plastic coating 77 and extensions 90' and 90'' are preferably formed integrally. Extension 90'' has an opening 93 for the reception of rolling bearing 76. The latter is preferably pressed into opening 93 (cf. FIG. 7).

Figure 7:
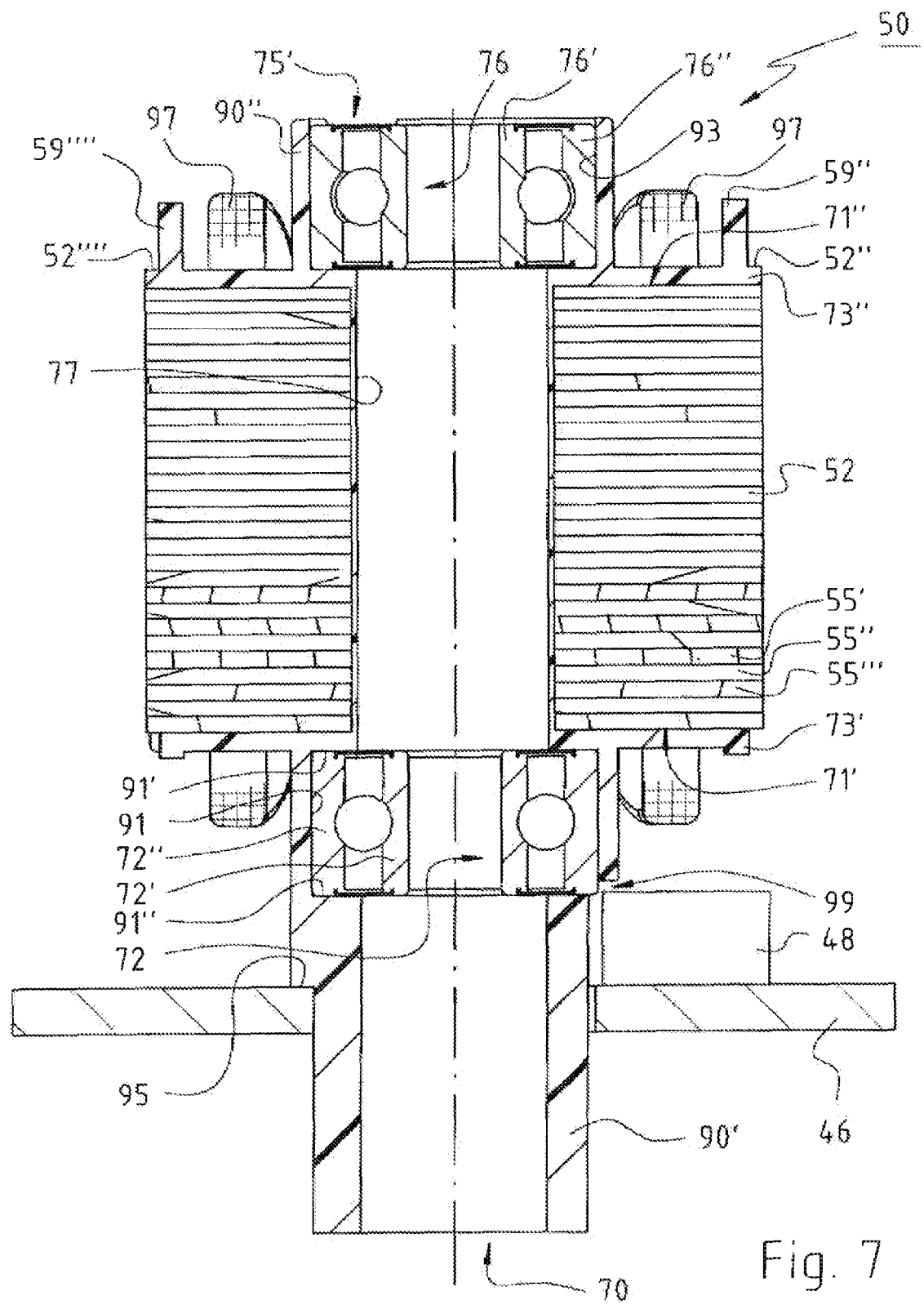
FIG. 7 is a sectioned view of the internal stator of FIG. 6 with both rolling bearings.

FIG. 7 is a sectioned view of internal stator 50 with both rolling bearings 72 and 76.

Figure 8:
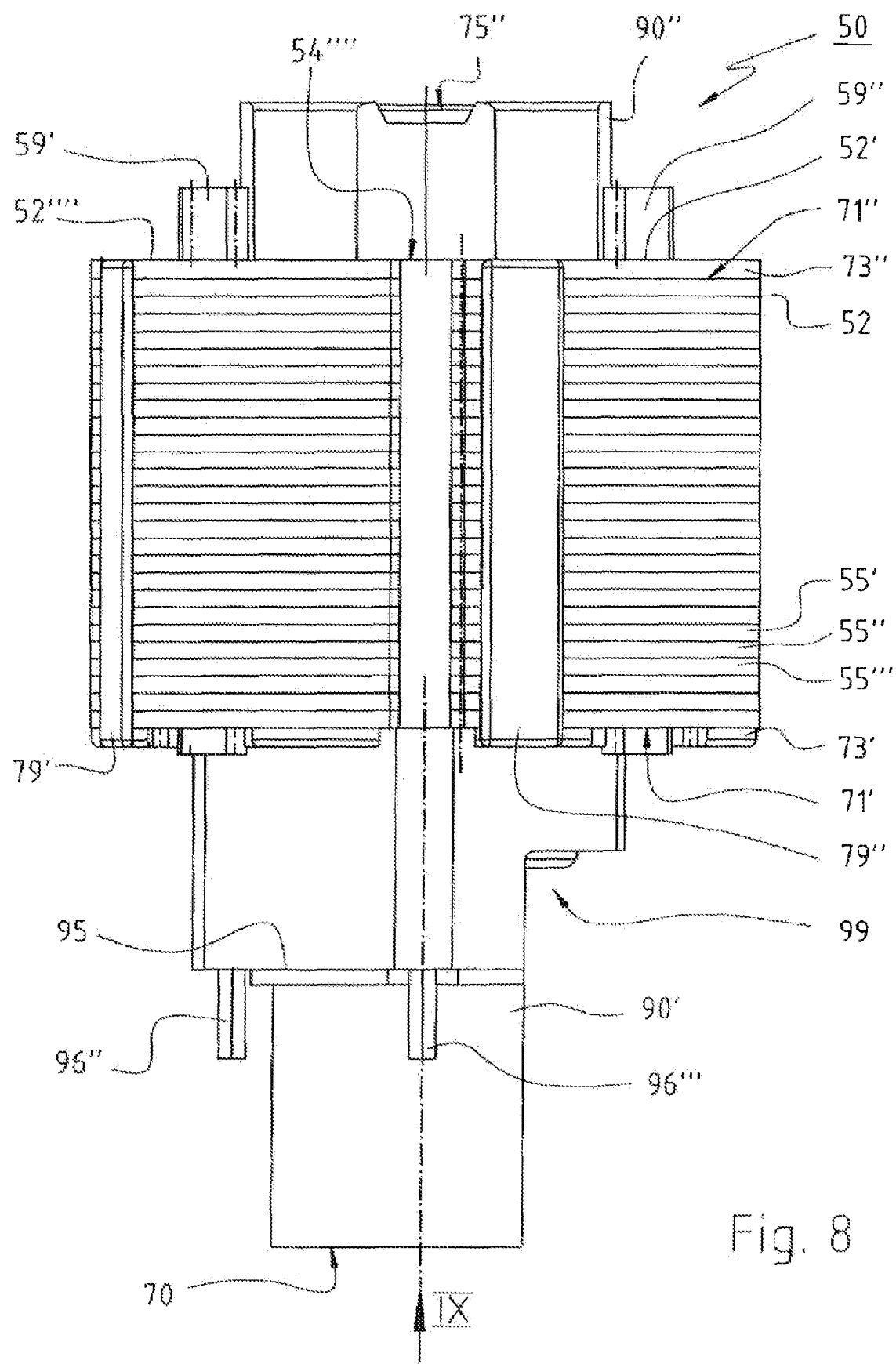
FIG. 8 is a side view of the internal stator of FIG. 1 with injection-embedded connector elements 96.

FIG. 8 is another side view, analogous to FIG. 5, of internal stator 50. In contrast to the side view of FIG. 5, internal stator 50 is rotated 45° to the right in FIG. 8, and is depicted without circuit board 46 and component 48. Slot 54'''' located between stator poles 52' and 52'''', and connector elements 96'''' and 96''' injection-embedded into shoulder 95, are thus visible in FIG. 8. Said connector elements are preferably implemented as bronze pins.

FIG. 9 is a top view of internal stator 50. FIG. 9 shows a preferred embodiment of stator lamination stack 52 equipped with plastic coating 77, and illustrates slots 54', 54'', 54''', and 54'''' provided between poles 52', 52'', 52''', and 52''''.

As is apparent from FIG. 9, end layer 73' of plastic coating 77 has cutouts 56', 56'', 56''', and 56'''' at the axial ends of slots 54', 54'', 54''', and 54''''. End layer 73'' located opposite end layer 73' analogously has cutouts 58', 58'', 58''', and 58''''. These cutouts at both ends allow stator winding 97 (not shown in FIG. 9) to be arranged on stator lamination stack 52.

All the poles 52'', 52'', 52''', and 52'''' have an identical configuration. To simplify matters, only the configuration of pole 52' will therefore be described. The latter has a pole core 12 and a pole shoe having pole ends or pole horns 14, 16. Pole horn 16, onto which plastic facing 79' is applied, has a smaller diameter than pole horn 14. This conformation is usually referred to as a "reluctance lamination form," and serves to generate a so-called "reluctance torque." For interaction with this stator shape, rotor magnet 28 has a trapezoidal magnetization.

Figure 10:
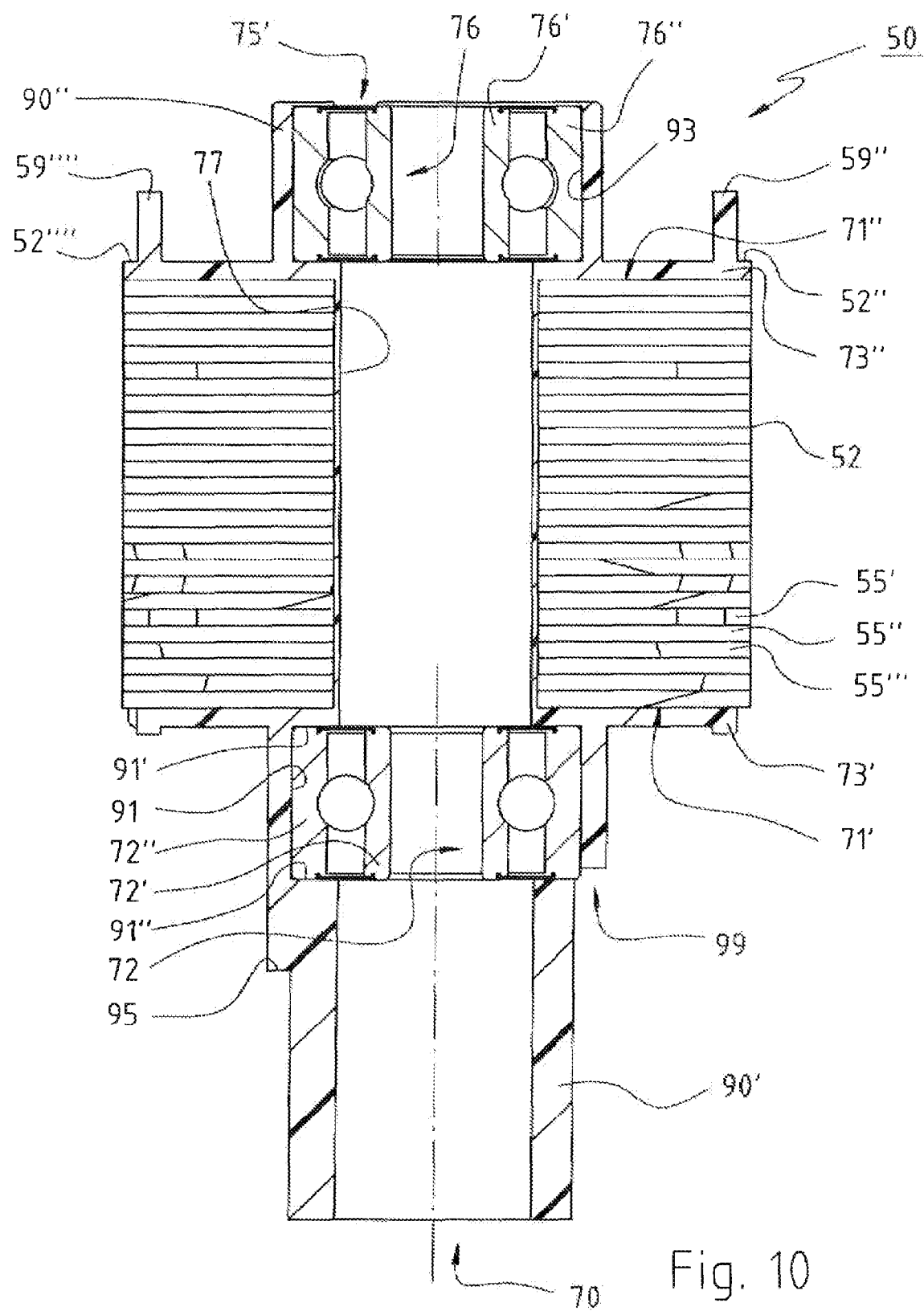
FIG. 10 is a section looking along line X-X of FIG. 9.
Figure 11:
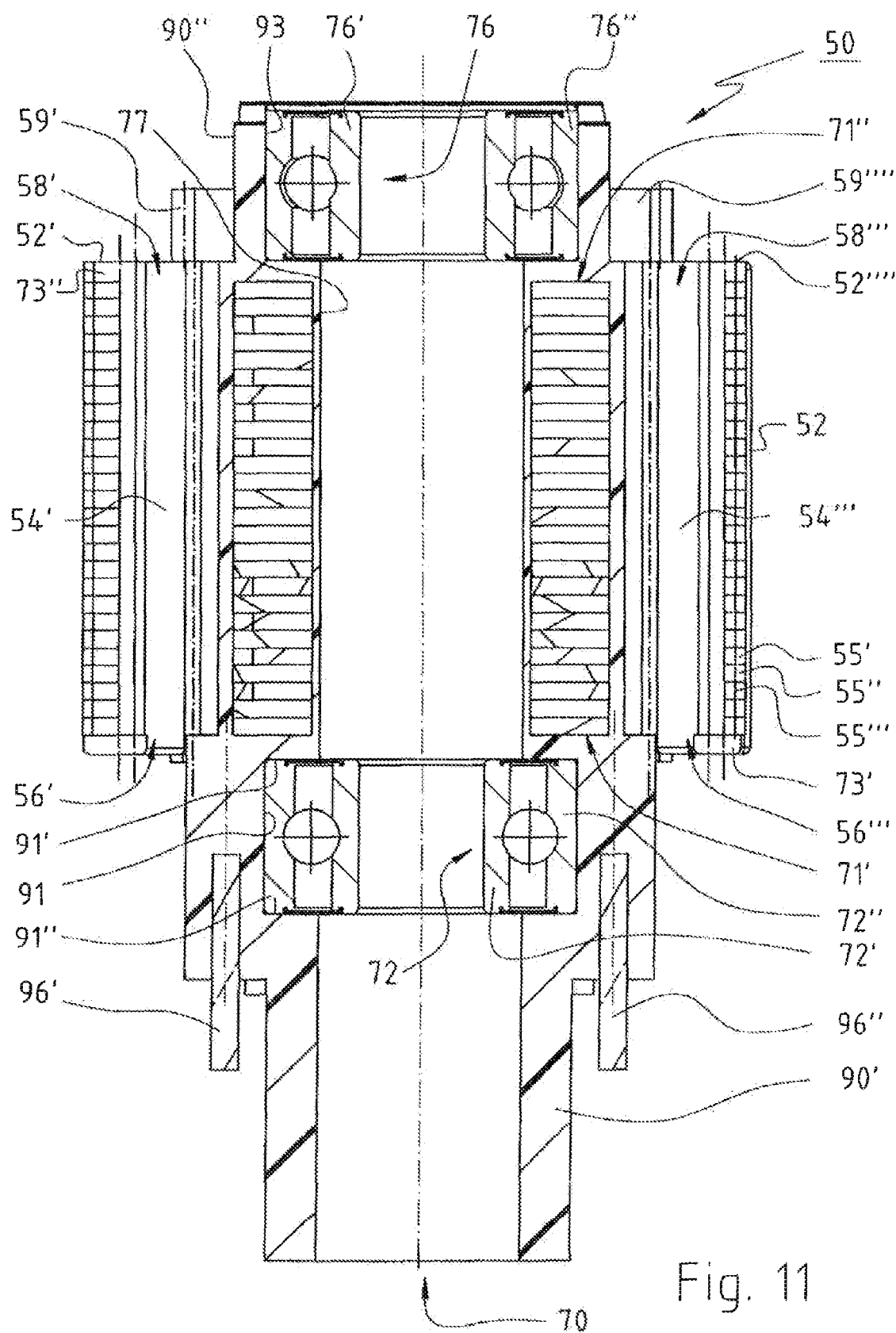
FIG. 11 is a section looking along line XI-XI of FIG. 9.

FIG. 10 is a sectioned view of internal stator 50 along section line X-X of FIG. 9, and FIG. 11 is a sectioned view of internal stator 50 along section line XI-XI of FIG. 9. FIG. 11 illustrates cutouts 56', 56''' in end layer 73' at end 71' of lamination stack 52, as well as cutouts 58', 58''' in end layer 73" at its end 71".

It has been found that, as a result of the type of journaling described, the fan depicted in FIG. 13 can be operated at a rotation speed of 15,000 rpm. Many variants and modifications are of course possible within the scope of the present invention.

The invention claimed is:

1. An electronically commutated motor (21) having a largest dimension not exceeding 40 mm, comprising:
   a permanent-magnet external rotor (22) having a rotor shaft (34);
   an internal stator (50) having a stator lamination stack (52) with stator poles (52', 52", 52''', 52'''') between which slots (54', 54", 54''', 54'''') are defined;
   an injection-molded plastic coating (77) which extends through the slots (54', 54", 54''', 54'''') and, together with the stator lamination stack (52), forms a bearing tube (70) for reception of at least one bearing (72, 76) for journalling of the rotor shaft (34),
   said bearing tube (70) being formed with a first axial extension (90') having a recess (91) formed with a first shoulder (91') and a second shoulder (91"), said first axial extension (90') being configured to engage around, and thereby support, a first rotor bearing (72) having an outer ring (72"), said first rotor bearing (72) being arranged in said recess (91) such that at least said outer ring (72") is axially fixed in a form-locked manner by said first and second shoulders (91', 91"), said outer ring (72") being injection-embedded into the plastic of the bearing tube (90').

2. The motor according to claim 1, wherein said first rotor bearing (72) is secured within said first axial extension (90') by forming plastic material of said bearing tube around said first rotor bearing.

3. The motor according to claim 1, wherein
the plastic coating (77) forms, at a first end (71') of the stator lamination stack (52), a first end layer (73') formed with corresponding cutouts (56', 56", 56''', 56'''') at axial ends of the slots (54', 54", 54''', 54'''').

4. The motor according to claim 1, wherein
said first axial extension (90') is formed with a first recess (91) serving to secure said first rotor bearing (72) therewithin.

5. The motor according to claim 3, wherein the first rotor bearing (72) is a rolling bearing.

6. The motor according to claim 4, wherein
at least part of the outer ring (72") of the first rolling bearing (72) is surrounded by the plastic of the first axial extension (90').

7. The motor according to claim 1, wherein
the plastic coating (77) and the first axial extension (90') are formed integrally.

8. The motor according to claim 1, wherein
the first rotor bearing (72) is anchored in plastic material of the first axial extension (90').

9. The motor according to claim 1, further comprising
a circuit board (46) and wherein
the first axial extension (90') has a third shoulder (95) against which said circuit board (46) abuts.

10. The motor according to claim 9, further comprising
connector elements (96', 96", 96'''), located on said third shoulder (95), for connecting a winding (97) wound on said internal stator (50).

11. The motor according to claim 10, wherein the connector elements (96', 96", 96''') are mounted in the third shoulder by forming plastic material of said shoulder (95) around said connector elements.

12. The motor according to claim 10, wherein
the connector elements (96', 96", 96''') are bronze pins.

13. The motor according to claim 1, wherein
the plastic coating (77) forms, at a second end (71") of the stator lamination stack (52), a second end layer (73") formed with cutouts (58', 58", 58''', 58'''') at axial ends of the slots (54', 54", 54''', 54''''),
said second end layer comprising a second axial extension (90") formed with a second recess (93) for reception of a second bearing (76) for journalling of the rotor shaft (34).

14. The motor according to claim 13, wherein
the second bearing (76) is a rolling bearing.

15. The motor according to claim 11, wherein the second bearing (76) has an outer ring (76") which is press-fitted into the second recess (93).

16. The motor according to claim 14, wherein the external rotor (22) comprises a rotor cup (24) that abuts against an inner ring (76') of the second bearing (76).

17. The motor according to claim 16, further comprising
a compression spring (94), mounted between an abutment (92), formed at a first end (35) of said rotor shaft, and an inner ring (72') of said first rotor bearing (72), said spring (94) urging said first ring (72) toward said second rotor bearing (76).

18. A fan (20) having a largest dimension not exceeding 40 mm, driven by an electronically commutated motor (21), said motor comprising:
   a permanent-magnet external rotor (22) having a rotor shaft (34);
   an internal stator (50) having a stator lamination stack (52) with stator poles (52', 52", 52''', 52'''') between which respective slots (54', 54", 54''', 54'''') are defined;
   a plastic coating (77) which extends through the slots (54', 54", 54''', 54'''') and, together with the stator lamination stack (52), forms a bearing tube (70) for reception of at least one bearing (72, 76) for journalling of the rotor shaft (34),
   said bearing tube (70) being formed with a first axial extension (90') configured to engage around, and thereby support, a first rotor bearing (72), wherein
   the rotor shaft (34) comprises, at a first end (35), an abutment (92) between which and an inner ring (72') of the first rotor bearing (72), there is provided an axially extending compression spring (94) that urges said inner ring (72') in a direction toward a second rotor bearing (76).

19. A fan (20) according to claim 18, further comprising
a fan wheel (23) with fan blades (26) projecting therefrom in a configuration adapted to serve as an axial fan.

20. The motor of claim 1, wherein the bearing tube (90') is formed with a recess (99) configured to accommodate an electronic component (48) associated with the motor.

\* \* \* \* \*